US009902177B2

(12) United States Patent
Mukaiyama et al.

(10) Patent No.: US 9,902,177 B2
(45) Date of Patent: Feb. 27, 2018

(54) TRANSPORT PROGRAM, TRANSPORT CONTROL DEVICE, MEDIUM TRANSPORT DEVICE, AND PRINTING APPARATUS

(71) Applicant: Seiko Epson Corporation, Tokyo (JP)

(72) Inventors: Kiyoshi Mukaiyama, Matsumoto (JP); Hiroyuki Tsuji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/004,177

(22) Filed: Jan. 22, 2016

(65) Prior Publication Data
US 2016/0214412 A1 Jul. 28, 2016

(30) Foreign Application Priority Data
Jan. 27, 2015 (JP) ................................. 2015-013588

(51) Int. Cl.
| B41J 15/04 | (2006.01) |
| B41J 11/42 | (2006.01) |
| B41J 11/36 | (2006.01) |
| B65H 20/36 | (2006.01) |
| B41J 11/38 | (2006.01) |
| G06F 3/0354 | (2013.01) |

(52) U.S. Cl.
CPC .............. *B41J 15/04* (2013.01); *B41J 11/36* (2013.01); *B41J 11/38* (2013.01); *B41J 11/425* (2013.01); *B65H 20/36* (2013.01); *G06F 3/03547* (2013.01); *B65H 2551/10* (2013.01); *B65H 2551/11* (2013.01)

(58) Field of Classification Search
CPC ....... G06F 3/017; B65H 20/36; B65H 18/085; B65H 2551/10; B65H 2551/11
See application file for complete search history.

(56) References Cited

U.S. PATENT DOCUMENTS

| 3,733,018 A * | 5/1973 | Breimayer ............ G03D 15/003 226/109 |
| 2002/0001010 A1* | 1/2002 | Abe ..................... B41J 2/17546 347/19 |
| 2004/0070659 A1* | 4/2004 | Lee ...................... B41J 2/16508 347/108 |
| 2005/0141944 A1* | 6/2005 | Lee ...................... B41J 11/0035 400/582 |
| 2005/0151770 A1* | 7/2005 | Takeuchi ................. B41J 13/08 347/9 |

(Continued)

FOREIGN PATENT DOCUMENTS

| GB | 2050661 A | * | 1/1981 | .............. B41J 11/36 |
| JP | 03103912 A | * | 4/1991 | |

(Continued)

OTHER PUBLICATIONS

Machine generated English translation of JPH03-103912A to Tachikawa, "Touch Panel Input Device"; generated via https://www4.j-platpat.inpit.go.jp/eng/tokujitsu/tkbs_en/TKBS_EN_GM101_Top.action on Jun. 7, 2016; 2 pp.*

*Primary Examiner* — Shelby Fidler
(74) *Attorney, Agent, or Firm* — Workman Nydegger

(57) ABSTRACT

A control device which controls transportation of a continuous paper receives an operation signal according to an operation amount by which a terminal is operated and generates a drive command which controls a transport speed of the continuous paper based on the operation signal.

13 Claims, 8 Drawing Sheets

(56) References Cited

U.S. PATENT DOCUMENTS

| | | | |
|---|---|---|---|
| 2009/0166417 A1* | 7/2009 | Dammann | G07C 13/00 235/386 |
| 2011/0261131 A1* | 10/2011 | Eve | B41J 11/002 347/104 |
| 2012/0050807 A1* | 3/2012 | Noda | H04N 1/00411 358/1.15 |
| 2013/0000812 A1* | 1/2013 | Takemoto | B32B 38/10 156/60 |
| 2013/0222305 A1* | 8/2013 | Kanno | G06F 3/0484 345/173 |
| 2013/0222307 A1 | 8/2013 | Ozawa | |
| 2015/0068408 A1* | 3/2015 | Nagae | H05B 6/062 99/332 |
| 2015/0165626 A1* | 6/2015 | Desai | B25J 9/1651 700/257 |
| 2016/0119492 A1* | 4/2016 | Sasahara | H04N 1/00411 358/1.15 |

FOREIGN PATENT DOCUMENTS

| | | | | |
|---|---|---|---|---|
| JP | 8-123114 | | 5/1996 | |
| JP | 2004104594 A | * | 4/2004 | G06F 3/04883 |
| JP | 2013-175090 A | | 9/2013 | |
| JP | 2014-051022 A | | 3/2014 | |

\* cited by examiner

TRANSPORT PROGRAM, TRANSPORT CONTROL DEVICE, MEDIUM TRANSPORT DEVICE, AND PRINTING APPARATUS

BACKGROUND

1. Technical Field

The present invention relates to a recording medium having a transport program, a transport control device, a medium transport device, and a printing apparatus.

2. Related Art

In the related art, an ink jet printer which prints images and the like onto a medium by ejecting a liquid such as an ink from a printing section onto a medium such as continuous paper that is transported on a support section by a transporting section, is known as a printing apparatus. As such a printer, there is a printer which prints a captured image onto a printing medium stored within the printer by using image data of an imaging target medium which is imaged by an imaging unit such as a smart phone communicated to the printer (for example, refer to JP-A-2014-51022). In the printer of JP-A-2014-51022, an imaging target medium which is set on a document stand is transported to the top surface of the printer by an automatic document feeder (ADF), and is imaged by the imaging unit.

However, in the printer of JP-A-2014-51022, the imaging target medium is transported by the ADF based on transport control which is set in advance. In the printer of JP-A-2014-51022, there is no disclosure of the transport control of the printing medium inside the printer. Therefore, it is considered that a user can not change the transport mode such as the transport amounts and the transport speeds of the imaging target medium and the printing medium, and there is room for improvement in this regard.

SUMMARY

An advantage of some aspects of the invention is to provide a transport program, a transport control device, a medium transport device, and a printing apparatus with which it is possible for a user to change a transport mode of a medium during the transportation of the medium.

Hereinafter, means of the invention and operation effects thereof will be described.

According to an aspect of the invention, there is provided a transport program to be executed by a transport control device in a medium transport device provided with a drive section which transports a medium and the transport control device which controls the drive section. The program causes the transport control device to perform receiving an operation signal according to an operation amount by which an operation section is operated, and driving the drive section by converting the operation signal into a drive command of the drive section.

In this case, when the operation signal which is output due to a user operating the operation section is received by the transport control device, the transport control device controls the transport mode of the medium by driving the drive section based on the operation signal. Therefore, it is possible to change the transport mode of the medium during the transportation of the medium.

In the transport program, in the receiving, a slide operation amount when a slide operation is performed using the operation section is preferably received as the operation signal, and, in the driving, at least one of a transport amount and a transport speed of the medium is preferably calculated based on the slide operation amount.

In this case, the transport amount and the transport speed of the medium are changed as transport modes of the medium based on the slide operation amount by which the user performs the slide operation on the operation section. Therefore, it is possible to easily change the transport amount and the transport speed of the medium to those which are desired by the user during the transportation of the medium.

In the transport program, in the receiving, a slide direction when a slide operation is performed using the operation section is preferably received as the operation signal, and, in the driving, a drive direction of the drive section is preferably set based on the slide direction.

In this case, since the transport direction of the medium is set based on the slide direction which is the direction in which the user performs the slide operation on the operation section, the user can set the transport direction of the medium in an intuitive manner.

In the transport program, in the driving, although a transport speed of the medium is changed according to an operation amount by which the operation section is operated, when the transport speed of the medium reaches an upper limit speed, the transport speed of the medium is preferably set to the upper limit speed regardless of an operation indicating that the transport speed of the medium is to be increased.

In this case, when the transport speed of the medium reaches the upper limit speed, the transport speed of the medium is maintained at the upper limit speed even if an operation is performed on the operation section indicating that the transport speed of the medium is to be increased. Therefore, it is possible to suppress the occurrence of an excessive load being applied to the drive section.

The transport program preferably causes the transport control device to further perform mode switching between a continued feed mode which continues transportation of the medium after starting the transportation of the medium based on operation of the operation section, and an intermittent feed mode which transports the medium by only a transport amount of the medium according to an operation amount of the operation section based on the operation of the operation section.

In this case, in the continued feed mode, since the medium is transported even if the user does not operate the operation section, the operation amount when operating the transportation of the medium is reduced. In the intermittent feed mode, since the medium is transported according to the operation amount of the operation section, the user can determine the transport amount of the medium. Since the continued feed mode and the intermittent feed mode are provided in this manner and it is possible to switch between these modes, the user can appropriately operate the transport mode of the medium according to the transport state of the medium.

In the transport program, an image which is printed onto the medium is preferably displayed on the operation section, and, in the driving, the drive section is preferably driven such that the medium is transported in accordance with a slide operation of the image in the operation section.

In this case, since the medium is transported due to the image which is displayed on the operation section being directly subjected to a slide operation, it is possible to cause the transport amount of the medium by the drive section to approach the transport amount of the medium which is anticipated by the user.

In the transport program, an image which is printed onto the medium is preferably displayed on the operation section, in the receiving, positional information of a marker is preferably received based on an operation of applying the marker to the image in the operation section, and, in the driving, the drive section is preferably driven such that the medium is transported to the same position as the marker in the image based on the positional information of the marker.

In this case, since the medium is transported to a position of the image which the user desires due to the user performing an operation of applying the marker to the desired position of the image in the image in the operation section, it is possible to easily perform an operation of transporting the medium to a specific position.

In the transport program, the medium transport device preferably further includes a winding shaft which winds the medium on which printing is performed, and, in the driving, the drive section is preferably driven such that the medium which is wound onto the winding shaft is wound back.

In this case, the occurrence of the medium being placed on the floor surface, for example, is suppressed by the winding shaft winding the medium on which the printing is performed. Therefore, the occurrence of the medium being dirtied is suppressed.

According to another aspect of the invention, there is provided a transport control device capable of executing the transport program described above.

In this case, it is possible to obtain the same operation effects as the transport program.

According to still another aspect of the invention, there is provided a medium transport device which includes the transport control device described above.

In this case, it is possible to obtain the same operation effects as the transport program.

According to still another aspect of the invention, there is provided a printing apparatus which includes the medium transport device described above, and a printing section which performs printing on the medium which is transported by the medium transport device.

In this case, it is possible to obtain the same operation effects as the transport program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, description will be given of an embodiment of the printing apparatus with reference to the drawings.

Note that, the printing apparatus of the present embodiment is formed of an ink jet printer which performs printing by ejecting an ink, which is an example of the liquid, onto a medium, for example. The printer is a so-called serial printer with a printing system which performs printing by moving a printing section in a direction which intersects the transport direction of the medium.

Figure 1:
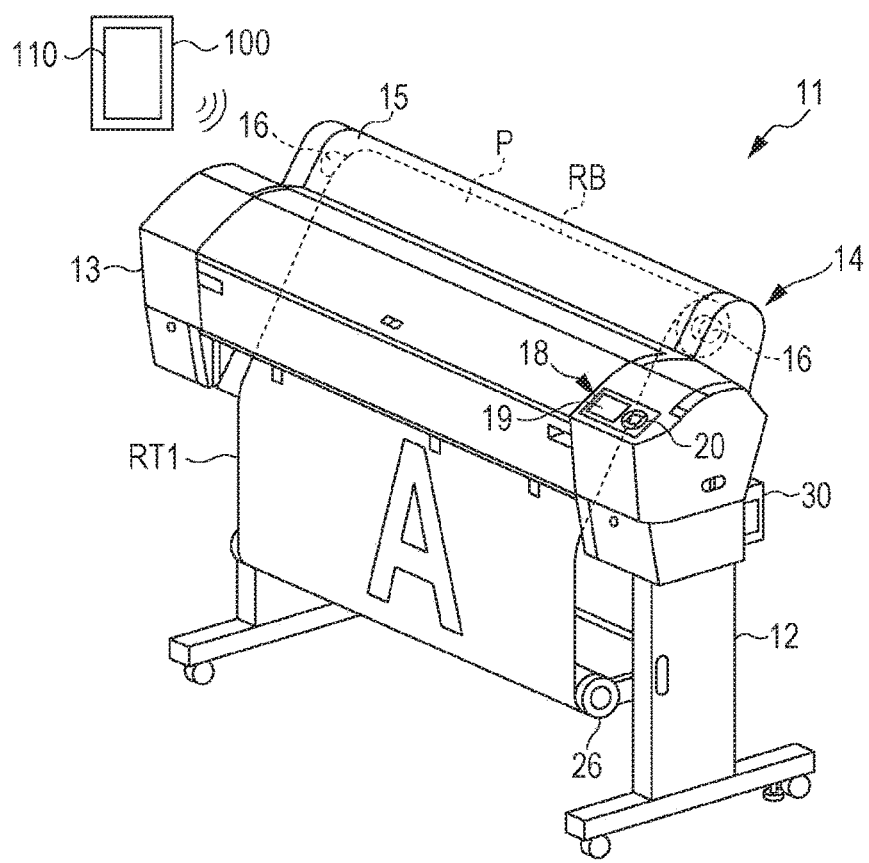
FIG. 1 is a perspective view of an embodiment of a printing apparatus.

As illustrated in FIG. 1, a printing apparatus 11 is provided with an apparatus main body 13 and a feed section 14. The apparatus main body 13 is substantially rectangular cuboid shaped and is supported by a leg stand 12. The feed section 14 is provided to protrude diagonally toward the rear of the top side of a rear surface portion of the apparatus main body 13. Note that, when referring to directions "front and rear", "left and right", and "up and down" of the printing apparatus 11 hereinafter, these refer to a case in which the printing apparatus 11 in FIG. 1 which has the horizontally long apparatus main body 13 is viewed from the front surface side.

The feed section 14 is provided with an opening/closing cover 15 which hinges upward. The opening/closing cover 15 is set to the open state and a roll body RB is loaded in the feed section 14. The roll body RB is formed by a long continuous paper P, which is an example of the medium, being wound onto the roll body RB in a roll shape. The roll body RB is supported by a pair of roll body support sections 16 which are provided in positions corresponding to both end portions of in the longitudinal direction of the roll body RB within the feed section 14. A feed motor 17 (refer to FIG. 2) for rotating the roll body RB is drive-coupled to the roll body support sections 16 via a reduction gear (not shown). The feed section 14 feeds the continuous paper P into the apparatus main body 13 using the feed motor 17. Note that, in FIG. 2, although the feed motor 17 is positioned on the outside of the feed section 14, in actuality, the feed motor 17 is accommodated on the inside of the feed section 14.

An operation section 18 for a user to operate the printing apparatus 11 is provided on the front-right side of the apparatus main body 13. The operation section 18 is provided with a display section 19 and operation buttons 20. The display section 19 is formed of a liquid crystal panel on which operation content is displayed, and the operation buttons 20 are for changing or selecting the operation content.

Figure 2:
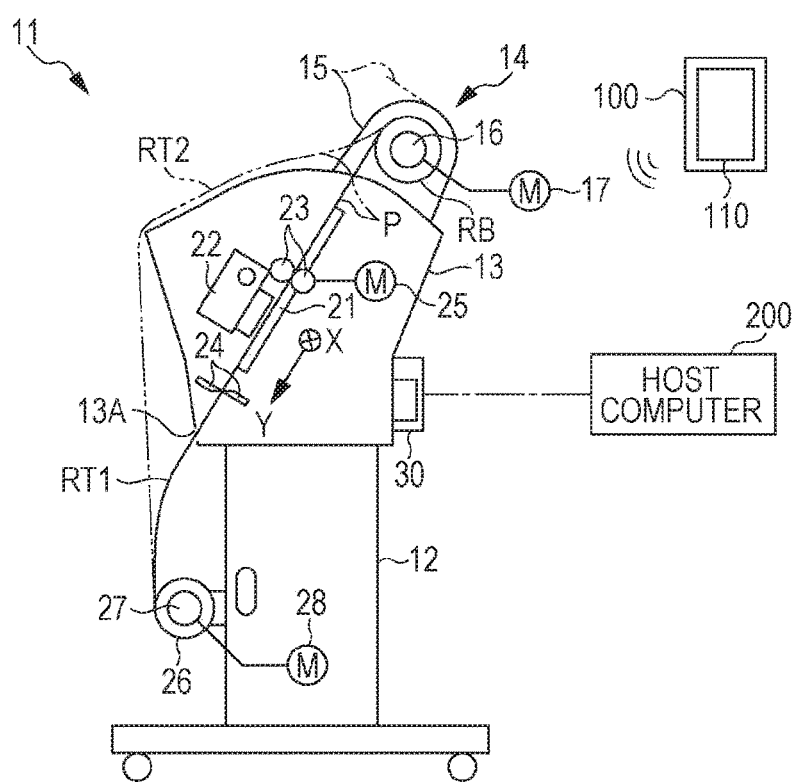
FIG. 2 is a schematic diagram illustrating the internal configuration of the printing apparatus of FIG. 1.

As illustrated in FIG. 2, a support section 21, a printing section 22, a transport roller pair 23, a cutting section 24, and a transport motor 25 are accommodated within the apparatus main body 13. The support section 21 supports, from the reverse side of the continuous paper P, the continuous paper P which is transported in a state of being fed out from the feed section 14 and nipped by the transport roller pair 23. The printing section 22 is formed of a liquid ejecting head which prints images and the like by ejecting an ink onto the continuous paper P in a printing region which is set on the support section 21. The cutting section 24 cuts the continuous paper P onto which the images and the like are printed by the printing section 22 in a width direction X (a direction orthogonally intersecting the paper surface in FIG. 2) of the continuous paper P which intersects a transport direction Y. The transport motor 25 is drive-coupled to the drive roller of the transport roller pair 23 via a reduction gear (not shown).

As illustrated in FIG. 2, a winding section 26 is provided on the leg stand 12. The winding section 26 winds the continuous paper P which is discharged from a discharge port 13A which is formed in the front surface portion of the apparatus main body 13. The winding section 26 is provided with a winding shaft 27 which extends in the width direction X. A winding motor 28 for winding the continuous paper P by rotating the winding shaft 27 is drive-coupled to the winding shaft 27 via a reduction gear (not shown).

As illustrated in FIG. 2, a control device 30 is provided on the bottom-rear side of the apparatus main body 13. The control device 30 is an example of a transport control device which controls the feed motor 17, the printing section 22, the transport motor 25, the cutting section 24, and the winding motor 28 which are described above. A print command is transmitted from a terminal 100 or a host computer 200 to the control device 30 by wired or wireless communication. The print command is an execution command of print data or various processes. The control device 30 controls the feed motor 17, the printing section 22, the transport motor 25, the cutting section 24, and the winding motor 28 based on the print command which is transmitted from the terminal 100 or the host computer 200. Note that, in the present embodiment, the medium transport device is formed of the feed section 14, the transport roller pair 23, the transport motor 25, the winding section 26, and the control device 30, and the drive section is formed of the feed motor 17, the transport motor 25, and the winding motor 28.

An operation signal is transmitted from the terminal 100 to the control device 30 based on the operation of the terminal 100 by the user. The operation signal is for controlling the transportation of the continuous paper P when the inspection of the images and the like which are printed onto the continuous paper P is performed. The control device 30 controls the feed motor 17 and the winding motor 28 based on the operation signal which is transmitted from the terminal 100. Note that, although the terminal 100 of the present embodiment communicates with the control device 30 in a wireless manner, the terminal 100 may communicate with the control device 30 in a wired manner.

In the terminal 100, the user downloads, in advance, content containing programs for controlling the transportation of the continuous paper P during inspection at a cost or for free from a server (not shown) via a network such as the Internet. Alternatively, the content is stored in the terminal 100 by connecting a storage medium containing the content to the terminal 100. Note that, although the terminal 100 may be a permanent installation type of terminal, it is more preferable that the terminal 100 is a portable terminal such as a smart phone or a portable information terminal (a personal digital assistant (PDA)). As long as the terminal is portable, a tablet personal computer, a laptop personal computer, or the like may be used.

Figure 3:
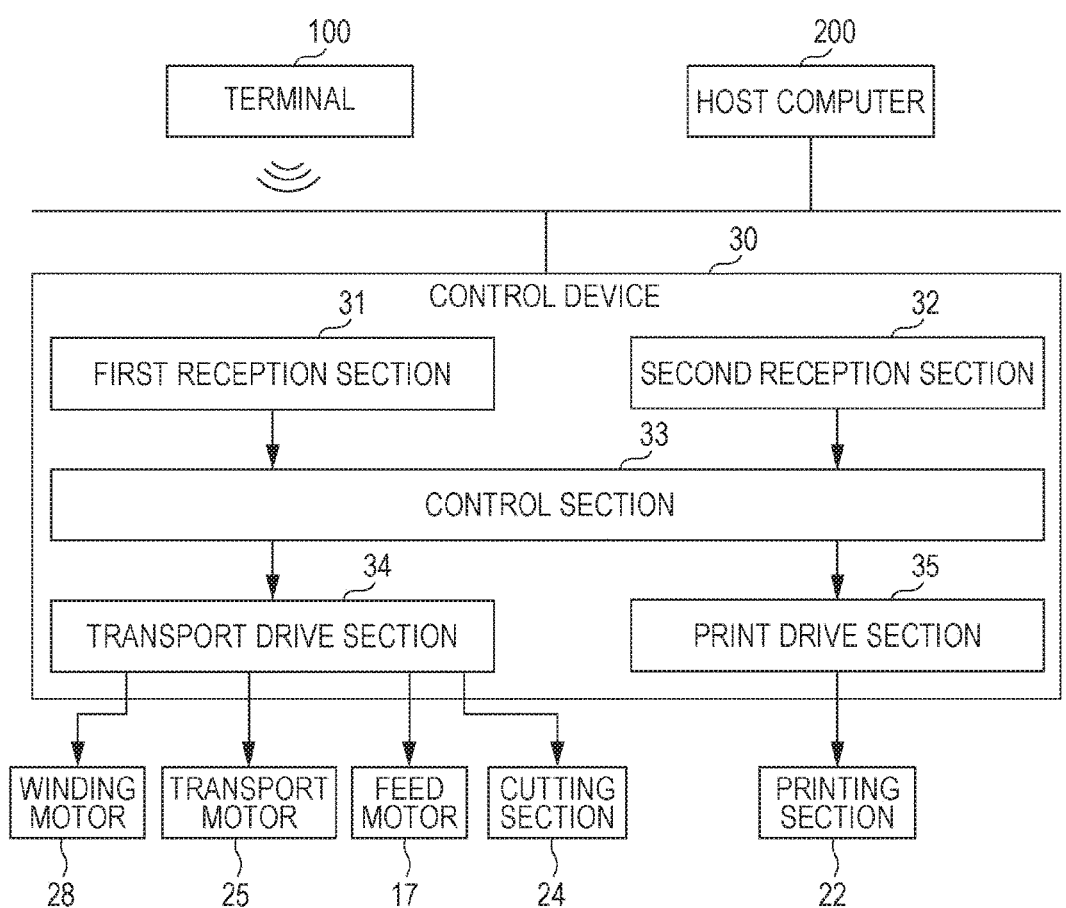
FIG. 3 is a block diagram illustrating the control configuration of the printing apparatus of FIG. 1.

As illustrated in FIG. 3, the control device 30 is configured to include a first reception section 31, a second reception section 32, a control section 33, a transport drive section 34, and a print drive section 35.

The first reception section 31 receives the print command from the terminal 100 or the host computer 200, and the second reception section 32 receives the print command or the operation signal from the terminal 100. The control section 33 outputs a drive command indicating that the continuous paper P is to be transported to the transport drive section 34 and a control command for causing the printing section 22 to operate to the print drive section 35 based on the print command and the operation signal. The transport drive section 34 controls the feed motor 17, the transport motor 25, the cutting section 24, and the winding motor 28 based on the drive command from the control section 33. The print drive section 35 controls the printing section 22 based on the control signal from the control section 33.

The control device 30 is provided with a printing mode in which printing is performed on the continuous paper P, and an inspection mode for a user to execute an inspection of the continuous paper P as control modes. The printing mode and the inspection mode are switched based on the operation of the terminal 100, for example. Note that, the printing mode and the inspection mode may be switched based on the operation of the operation section 18 of the printing apparatus 11 or the operation of the host computer 200. The control device 30 is provided with a transport program in which the control device 30 receives an operation signal from the terminal 100 (a reception step), converts the received operation signal into a drive command which drives the feed motor 17 and the winding motor 28, and drives the feed motor 17 and the winding motor 28 (a driving step). Note that, the transport program may be downloaded by the user, in advance, to the control device 30 through a network such as the Internet at a cost or for free from a server (not shown). Alternatively, the transport program may be stored in the control device 30 by a storage medium containing the transport program being connected to the control device 30.

As illustrated in FIG. 2, when the control device 30 in the printing mode, the printing apparatus 11 operates in the following manner. In other words, the images and the like which are received from the host computer 200 are printed onto the continuous paper P by transportation of the continuous paper P from the feed section 14 to the printing region caused by the feed motor 17, the transport motor 25, and the winding motor 28 rotating forward, and ejection of an ink onto the continuous paper P by the printing section 22 being performed alternately. The continuous paper P which is discharged from the discharge port 13A of the apparatus main body 13 is wound onto the winding shaft 27. In other words, as illustrated by a first transport path RT1 of the solid line in FIG. 2, when the control device 30 is in the printing mode, the continuous paper P is transported from the feed section 14, through the printing region, and to the winding section 26 via the discharge port 13A.

Meanwhile, when the control device 30 is in the inspection mode, the continuous paper P which is wound onto the winding shaft 27 is wound onto the feed section 14 due to the winding motor 28 and the feed motor 17 rotating backward in a state in which the terminal end, which is the free end portion, of the continuous paper P which is wound onto the winding shaft 27 is attached to the feed section 14. In other words, as illustrated by a second transport path RT2 of the double-dot-dash line in FIG. 2, when the control device 30 is in the inspection mode, unlike in the first transport path RT1, the continuous paper P is transported from the winding section 26, through a front surface 13B side and a top surface 13C side of the apparatus main body 13, to the feed section 14. Note that, when the control device 30 is in the inspection mode, the printing section 22 and the transport motor 25 are stopped.

Next, description will be given of the configuration of the terminal 100. Note that, in the following description of the terminal 100, when referring to directions "left and right" and "up and down" of the terminal 100, these refer to a case in which the terminal 100 in FIGS. 4 and 5 is viewed from the front surface side.

The terminal 100 is provided with a touch panel 110 including a liquid crystal screen, and an operation signal is output to the control device 30 (refer to FIG. 2) based on an operation amount or the like which a user operates on the touch panel 110. As illustrated in FIGS. 4 and 5, the display content of the touch panel 110 differs between the printing mode and the inspection mode of the control device 30.

Figure 4:
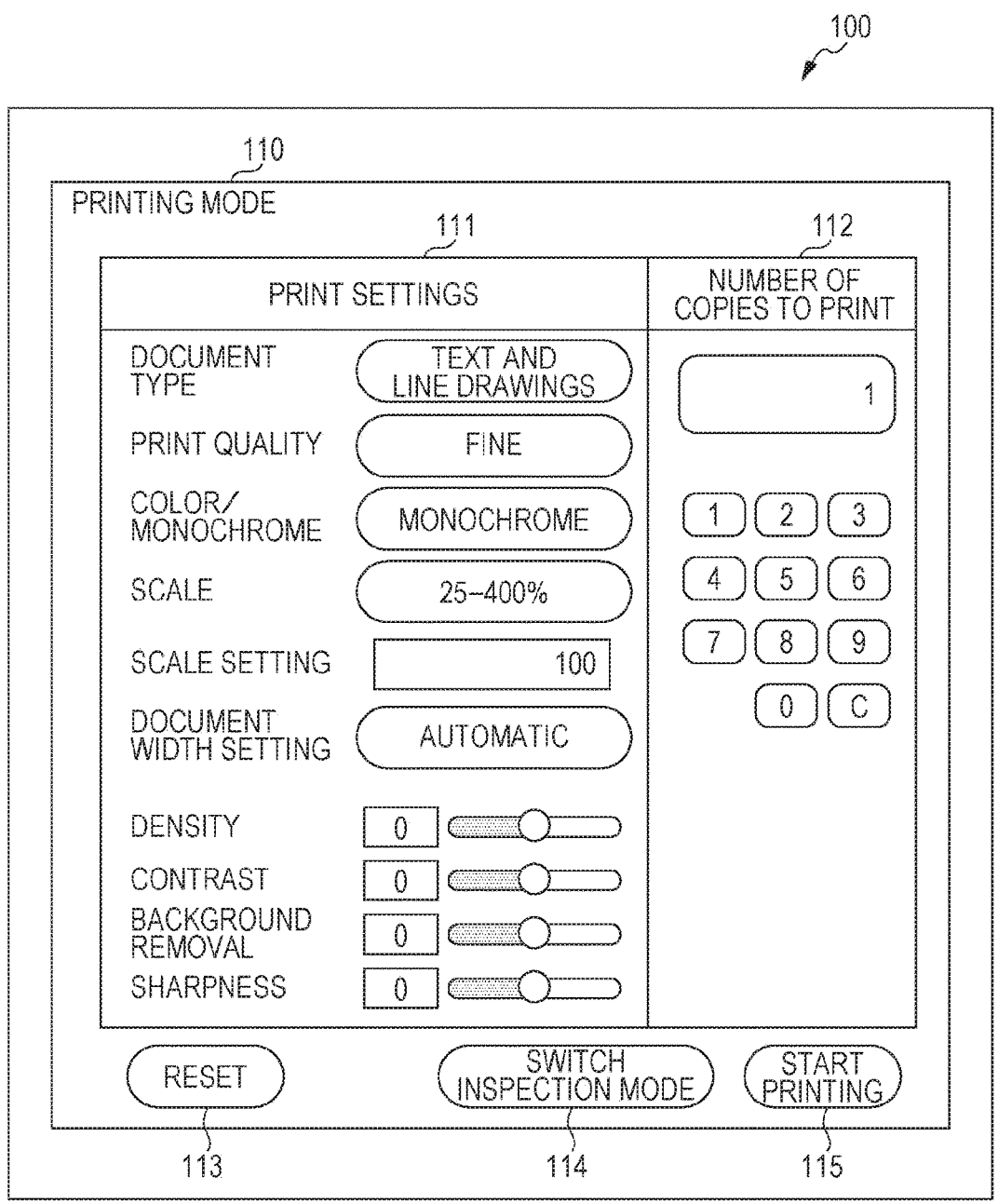
FIG. 4 is a plan view of an embodiment of a terminal during a printing mode.
Figure 5:
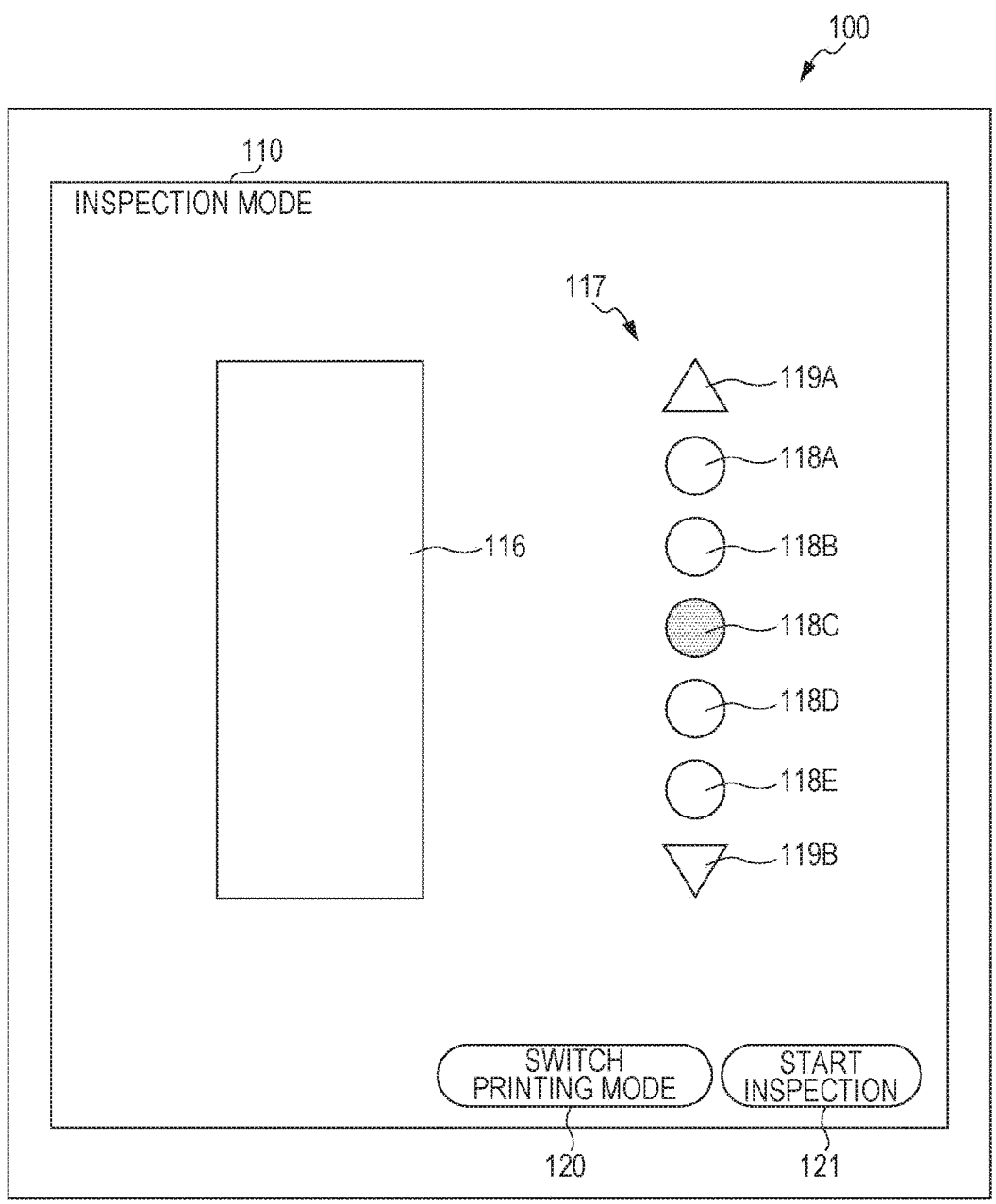
FIG. 5 is a plan view of the terminal during an inspection mode.

As illustrated in FIG. 4, when the control device 30 is in the printing mode, the touch panel 110 displays a first setting region 111 on the left side of the touch panel 110, and a second setting region 112 on the right side of the touch panel 110. The first setting region 111 is for setting the conditions relating to the printing onto the continuous paper P, and the second setting region 112 is for setting the number of copies to be printed. The first setting region 111 contains the fields "document type", "print quality", "color/monochrome", "scale", "scale setting", and "document setting". The fields are for selecting the type of the image or the like which is to be printed on the continuous paper P (hereinafter referred to as a "printing image"), selecting the quality of the printing image, setting the colors of the printing image, displaying the scale of the printing image, setting the scale of the printing image, and setting the width of the continuous paper P, respectively. The first setting region 111 contains the fields "density", "contrast", "background removal", and "sharpness" of the printing image as more detailed settings of the printing image at the bottom side of the touch panel 110. The second setting region 112 is formed of the buttons "0" to "9" and "C", and the number of copies to be printed is set based on the operation of these buttons.

In the touch panel 110, a reset button 113, an inspection switching button 114, and a print starting button 115 are displayed below the first setting region 111 and the second setting region 112. The reset button 113 is displayed on the left end of the touch panel 110, and by being operated by being pressed, resets the conditions relating to the printing onto the continuous paper P and the setting of the number of copies to be printed. The inspection switching button 114 is displayed on the right side of the reset button 113, and by being operated by being pressed, outputs a switching signal for switching from the printing mode to the inspection mode to the control device 30. The print starting button 115 is displayed on the right end of the touch panel 110, and due to the print starting button 115 being operated by being pressed, the printing apparatus 11 starts the printing onto the continuous paper P based on the conditions relating to the printing onto the continuous paper P and the number of copies to be printed.

As illustrated in FIG. 5, when the control device 30 is in the inspection mode, the touch panel 110 displays a slide operation portion 116 on the left side of the touch panel 110, and displays a speed display portion 117 on the right side of the touch panel 110. In the touch panel 110, a print switching button 120 and an inspection starting button 121 are displayed closer to the bottom side than the slide operation portion 116 and the speed display portion 117. By being operated by being pressed, the print switching button 120 outputs a switching signal for switching from the inspection mode to the printing mode to the control device 30. By being operated by being pressed, the inspection starting button 121 starts the transportation of the continuous paper P from the winding section 26 to the feed section 14 for the inspection of the continuous paper P.

The slide operation portion 116 outputs the direction of a slide operation (hereinafter referred to as the "slide direction") and the operation amount of the slide operation (hereinafter referred to as the "slide operation amount") as an operation signal due to the user performing a slide operation in the slide operation portion 116. Note that, an example of slide operation is a flick operation.

The speed display portion 117 is formed of five round symbols 118A to 118E and two triangular symbols 119A and 119B, and displays the transport speed of the continuous paper P. The five round symbols 118A to 118E are lined up in a row in the up-down direction of the touch panel 110. The round symbol 118C indicates a transport speed which serves as a reference for the continuous paper P (hereinafter referred to as the "reference transport speed"), the round symbol 118B indicates a transport speed which is faster than the reference transport speed, and the round symbol 118A indicates the maximum transport speed. Meanwhile, the round symbol 118D indicates a transport speed which is slower than the reference transport speed, and the round symbol 118E indicates a transport speed which is slower than the transport speed of the round symbol 118D. For example, the display of the round symbols 118A to 118E changes according to the transport speed of the continuous paper P such as when the transport speed of the continuous paper P is set to the reference transport speed, the inner portion of the round symbol 118C changes to a black color. The triangular symbol 119A is positioned above the round symbol 118A, and the inner portion of the triangular symbol 119A changes to a black color when the transport speed of the continuous paper P is changed to become faster. The triangular symbol 119B is positioned below the round symbol 118E, and the inner portion of the triangular symbol 119B changes to a black color when the transport speed of the continuous paper P is changed to become slower. Note that, the reference transport speed is the transport speed of the continuous paper P at which the user considers it easy to perform the inspection when the user performs the inspection of the continuous paper P on which the printing is performed. The reference transport speed is determined in advance by experimentation or the like and is set as the initial value of the transport speed.

Description will be given of the control of the transport direction and the transport speed of the continuous paper P based on the operation of the slide operation portion 116 of the terminal 100.

When the inspection starting button 121 of the terminal 100 is operated by being pressed after the control device 30 is switched to the inspection mode, the continuous paper P is transported from the winding section 26 toward the feed section 14 (refer to FIG. 2 for both) as the reference state of the inspection mode. When the user operates the slide operation portion 116 as described earlier, the terminal 100 outputs an operation signal containing the slide direction and the slide operation amount to the control device 30.

The control device 30 determines the increasing or decreasing of the transport speed of the continuous paper P based on the transport direction of the continuous paper P and the slide direction. Specifically, in a case in which the continuous paper P is transported from the winding section 26 toward the feed section 14, the control device 30 increases the transport speed of the continuous paper P when the control device 30 receives an operation signal indicating that the slide operation portion 116 is subjected to an upward slide operation, and the control device 30 decreases the transport speed of the continuous paper P when the control device 30 receives an operation signal indicating that the slide operation portion 116 is subjected to a downward slide operation. Meanwhile, in a case in which the continuous paper P is transported from the feed section 14 toward the winding section 26, the control device 30 decreases the transport speed of the continuous paper P when the control device 30 receives an operation signal indicating that the slide operation portion 116 is subjected to an upward slide operation, and the control device 30 increases the transport speed of the continuous paper P when the control device 30 receives an operation signal indicating that the slide operation portion 116 is subjected to a downward slide operation.

The control device 30 sets a change amount of the transport speed of the continuous paper P based on the slide operation amount. Specifically, a map (not shown) indicating the relationship between the slide operation amount and the change amount of the transport speed of the continuous paper P is stored in the control device 30. The map indicates a relationship in which the change amount of the transport speed of the continuous paper P is greater the greater the slide operation amount. When the control device 30 receives the slide operation amount, the control device 30 determines the change amount of the transport speed of the continuous paper P using the map.

In a state in which the continuous paper P is transported from the winding section 26 toward the feed section 14, the slide operation portion 116 is subjected to a downward slide operation and the transport speed of the continuous paper P is reduced. When the slide operation portion 116 is further subjected to a downward slide operation in a state in which the transport speed is "0", the control device 30 changes to transporting from the feed section 14 toward the winding section 26 as the transport direction of the continuous paper P. In other words, the control device 30 changes the rotation direction (the drive direction) of the feed motor 17 and the winding motor 28 from reverse rotation to forward rotation.

Next, description will be given of the inspection method of the continuous paper P. Note that, the constituent elements of the printing apparatus 11 to which symbols are assigned in the following description indicate the constituent elements of the printing apparatus 11 of FIGS. 1 to 3, and the constituent elements of the terminal 100 to which symbols are assigned indicate the constituent elements of the terminal 100 of FIGS. 4 and 5. After the printing onto the continuous paper P by the printing section 22 based on the print commands is all completed, for example, the user changes the control device 30 from the printing mode to the inspection mode by operating the inspection switching button 114 in the touch panel 110 of the terminal 100 by pressing the inspection switching button 114.

The inspection method includes a first winding step, a continuous paper attachment step, and a second winding step. In the first winding step, the continuous paper P which is printed on by the printing section 22 is wound onto the winding shaft 27, in the continuous paper attachment step, the continuous paper P which is wound onto the winding shaft 27 is attached to the feed section 14, and in the second winding step, the continuous paper P which is wound onto the winding shaft 27 is wound onto the feed section 14.

In the first winding step, after the printing onto the continuous paper P by the printing section 22 based on the print commands is all completed, the continuous paper P is cut in the width direction X by the cutting section 24. The cut continuous paper P is all wound onto the winding shaft 27 due to the winding motor 28 rotating forward. Alternatively, the continuous paper P is all wound onto the winding shaft 27 in a state in which the continuous paper P is all fed out and the upstream side end portion of the continuous paper P is separated from the feed section 14.

Figure 6:
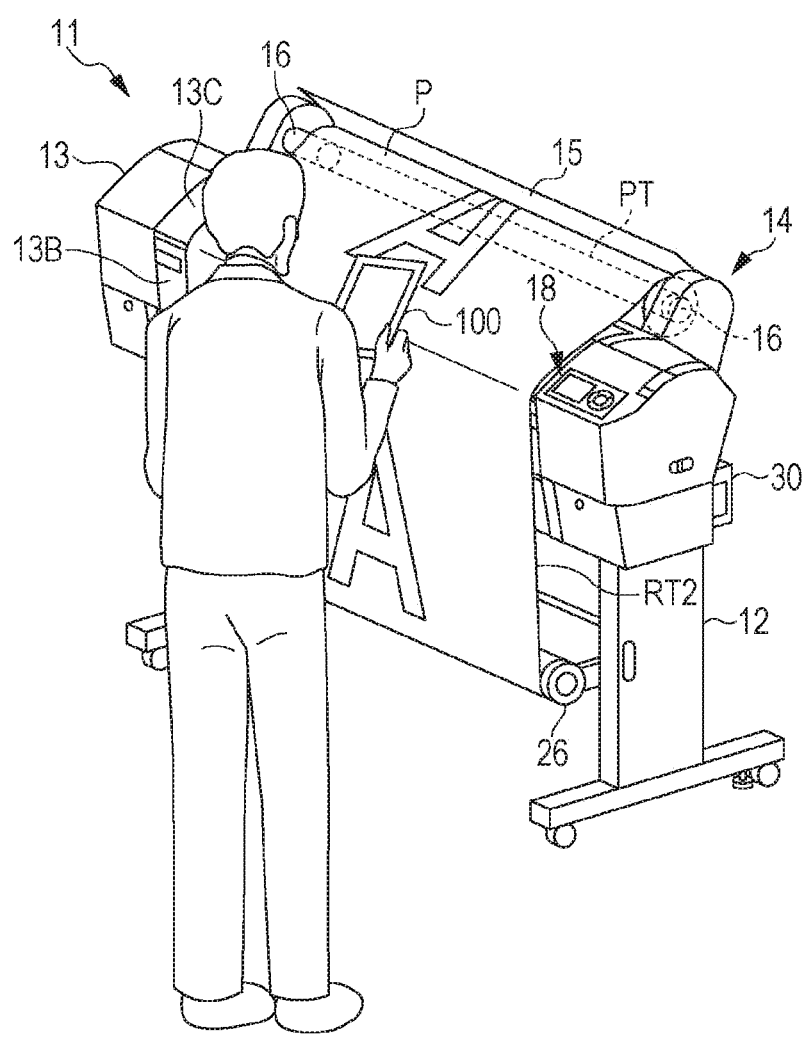
FIG. 6 is a perspective view of the printing apparatus during inspection of a medium.

Next, in the continuous paper attachment step, the opening/closing cover 15 of the feed section 14 is set to an open state and the roll body RB (when all of the continuous paper P in the roll body RB is fed out, a paper tube of the roll body RB) which is supported by the roll body support section 16 of the feed section 14 is removed. A new paper tube PT (refer to FIG. 6) for winding the continuous paper P is attached to the roll body support section 16. The terminal end, which is a free terminal end, of the continuous paper P which is wound onto the winding shaft 27 is fed out from the winding shaft 27, and is attached to the paper tube PT using tape (not shown), for example. At this time, as illustrated by the double-dot-dash line in FIG. 2 and as illustrated in FIG. 6, the continuous paper P which is fed out from the winding shaft 27 passes the front surface 13B side and the top surface 13C side of the apparatus main body 13 on the outside thereof and is attached to the paper tube PT.

In this case, after the completion of the printing, since the terminal end of the continuous paper P is fed out from the winding shaft 27 without removing the winding shaft 27 from the printing apparatus 11, the surface of the continuous paper P onto which the images or the like are printed is on the front surface side. As illustrated by the double-dot-dash line in FIG. 2, the roller pair which nips the continuous paper P and the roller which makes contact with the surface onto which the images and the like are printed in the continuous paper P are not present in the second transport path RT2. Note that, when detecting the continuous paper P, the opening/closing cover 15 remains in the open state.

Next, in the second winding step, the control device 30 causes the winding motor 28 and the feed motor 17 to rotate in reverse. Accordingly, the continuous paper P which is wound onto the winding shaft 27 is wound back from the winding shaft 27 and wound onto the paper tube PT. At this time, as illustrated in FIG. 6, the user performing the inspection visually confirms the images and the like of the continuous paper P which is positioned in front of the printing apparatus 11 and is transported from the winding section 26 to the feed section 14.

Figure 7:
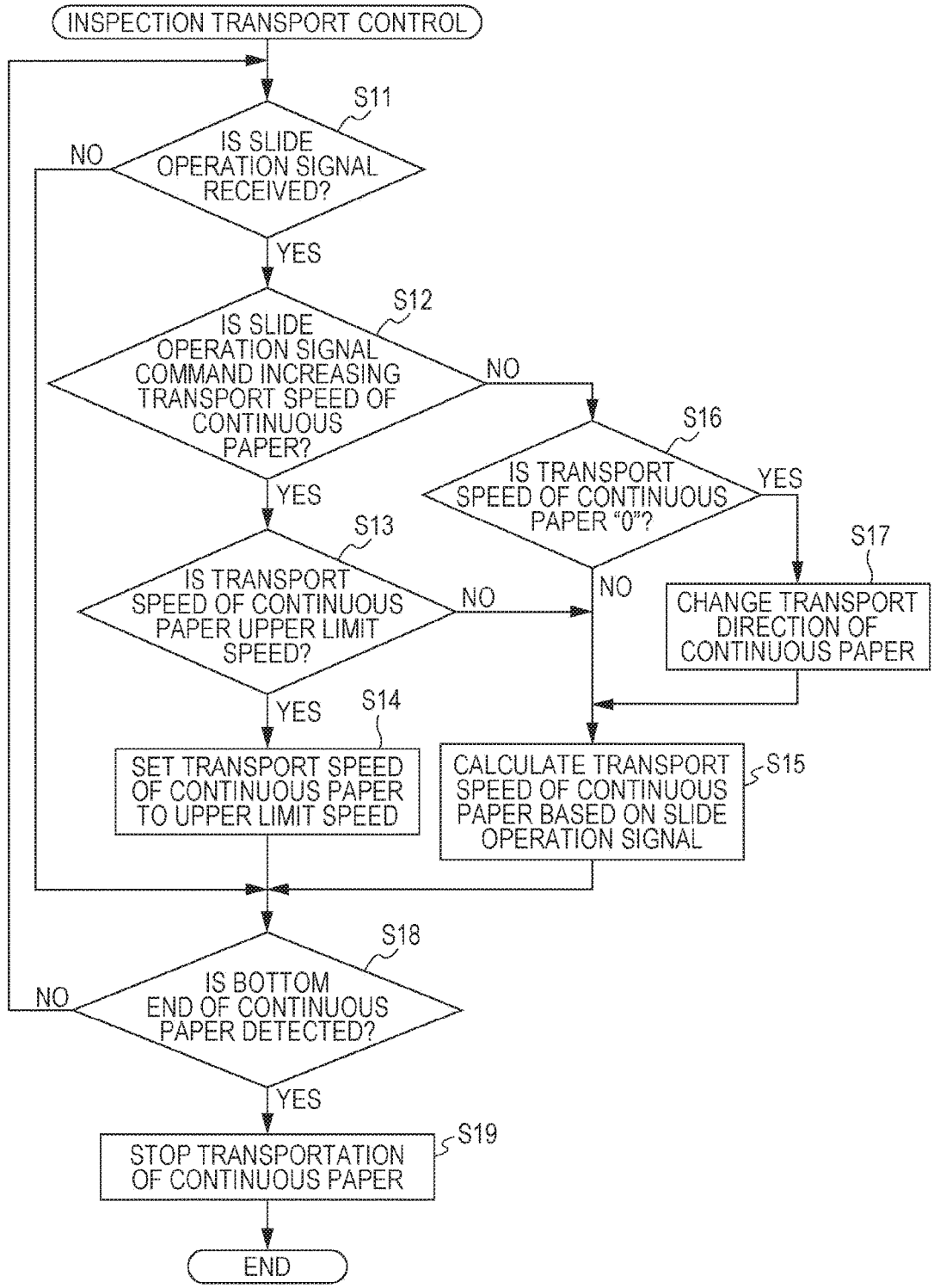
FIG. 7 is a flowchart of inspection transport control which is executed by the printing apparatus.

In the inspection mode, the control device 30 executes the inspection transport control, which is an example of the transport program, according to the procedure of the flowchart illustrated in FIG. 7. Hereinafter, description will be given of the process procedure of the inspection transport control. As illustrated in the flowchart of FIG. 7, after the start of the controlling, the inspection transport control repeatedly executes the procedure of steps S11 to S18 for a period until all of the continuous paper P is wound onto the feed section 14.

First, as an example of the reception step, the control device 30 determines whether or not an operation signal (hereinafter referred to as a "slide operation signal") based on a slide operation of the slide operation portion 116 has been received (step S11). When the control device 30 has not received the slide operation signal (no in step S11), that is, when the transport speed of the continuous paper P is not changed in the present control period, the process transitions to step S18 while maintaining the present transport speed of the continuous paper P. After the start of the inspection transport control, when the slide operation portion 116 has not been operated even once, the control device 30 maintains the reference transport speed as the transport speed of the continuous paper P. When the slide operation portion 116 is operated after the start of the inspection transport control, the control device 30 maintains the transport speed of the continuous paper P of the time at which the slide operation portion 116 is operated in the previous control period.

As step S18, the control device 30 determines whether or not the bottom end of the continuous paper P, which is the initial end which is the fixed end portion which is fixed to the winding shaft 27 in the continuous paper P, has been detected. The detection of the bottom end of the continuous paper P is performed by a position detection sensor (not shown) which is provided in the middle of the second transport path RT2 within the feed section 14 of the printing apparatus 11, for example. An example of the position detection sensor is an optical sensor.

When the control device 30 detects the bottom end of the continuous paper P (yes in step S18), the control device 30 stops the transportation of the continuous paper P by stopping the driving of the feed motor 17 and the winding motor 28 (step S19). Meanwhile, when the control device 30 does not detect the bottom end of the continuous paper P (no in step S18), the control device 30 returns to the determination of step S11 again in a state in which the driving of the feed motor 17 and the winding motor 28 is continued.

Meanwhile, when the control device 30 receives the slide operation signal (yes in step S11), that is, when the control device 30 changes the transport speed of the continuous paper P, as an example of the driving step, the transport speed and the transport direction of the continuous paper P is set as in the following steps S13 to S17, and the process subsequently transitions to step S18.

The control device 30 determines whether or not the received slide operation signal is a command setting the transport speed of the continuous paper P faster (step S12). When the received slide operation signal is a command setting the transport speed of the continuous paper P faster (yes in step S12), the control device 30 determines whether or not the transport speed of the continuous paper P is an upper limit speed (step S13). Here, an example of the upper limit speed is the maximum transport speed of the continuous paper P when the inner portion of the round symbol 118A of the speed display portion of FIG. 5 changes to a black color. Note that, the upper limit speed is a different transport speed from the maximum transport speed.

When the transport speed of the continuous paper P is the upper limit speed (yes in step S13), the control device 30 sets the transport speed of the continuous paper P to the upper limit speed regardless of the slide operation signal (step S14). Meanwhile, when the transport speed of the continuous paper P is not the upper limit speed (no in step S13), the control device 30 calculates the transport speed of the continuous paper P based on the received slide operation signal (step S15).

When the received slide operation signal is not a command setting the transport speed of the continuous paper P faster (no in step S12), that is, when the received slide operation signal is a command setting the transport speed of the continuous paper P slower, the control device 30 determines whether or not the transport speed of the continuous paper P is "0" (step S16).

When the transport speed of the continuous paper P is "0" (yes in step S16), the control device 30 changes the transport direction of the continuous paper P from the transport direction of the continuous paper P from the winding section 26 to the feed section 14 to the transport direction of the continuous paper P from the feed section 14 to the winding section 26 (step S17), and the process transitions to step S15. Meanwhile, when the transport speed of the continuous paper P is not "0" (no in step S16), the process transitions to step S15 without the control device 30 changing the transport direction of the continuous paper P.

Description will be given of an embodiment of the changing of the transport speed during the inspection of the continuous paper P with reference to FIG. 8.

Figure 8:
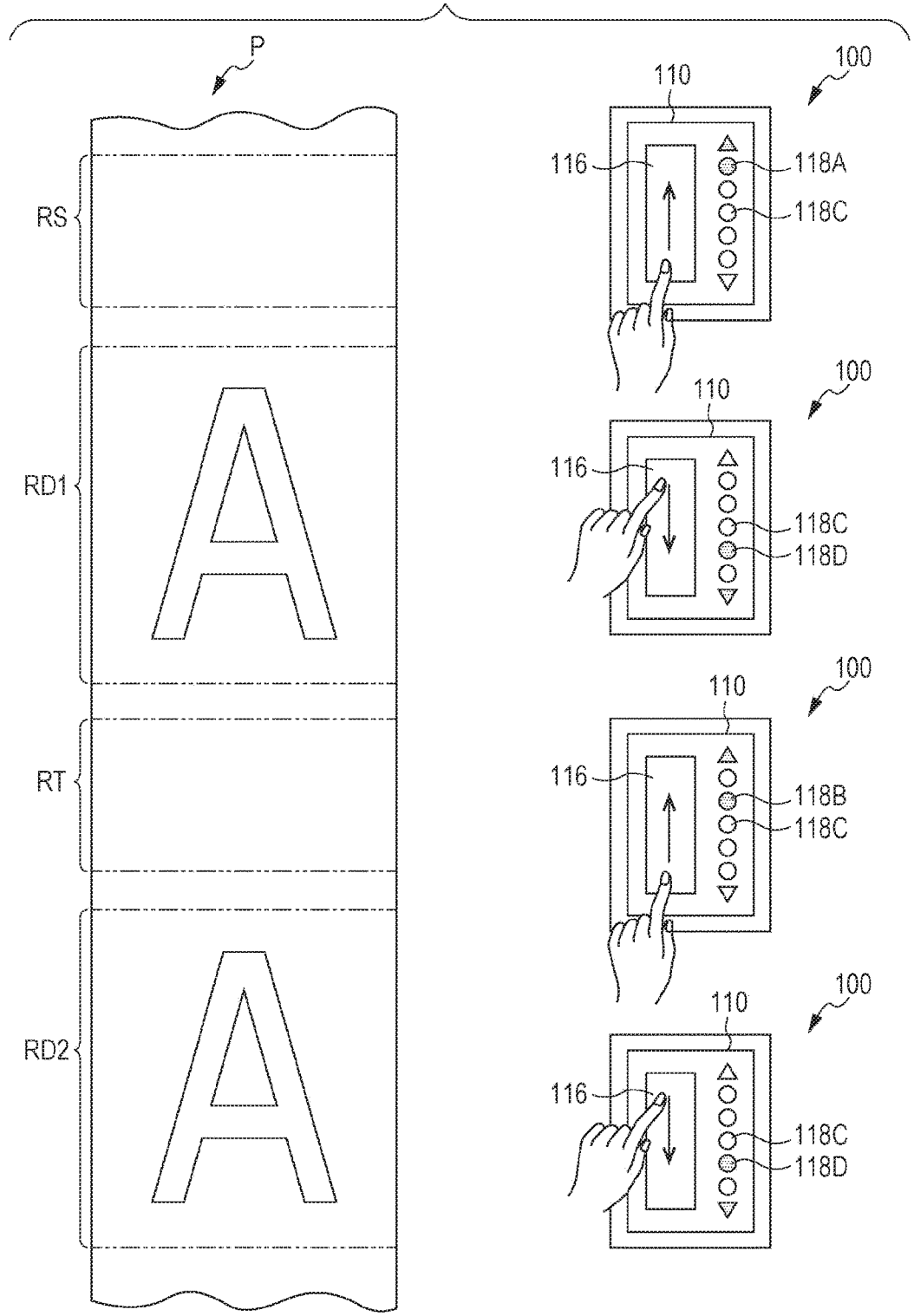
FIG. 8 is an explanatory diagram for explaining the operations of the printing apparatus.

In the printing mode, the printing apparatus 11 prints an image onto the continuous paper P using the printing section 22 (refer to FIG. 2) as illustrated in FIG. 8. A portion of the continuous paper P is formed of a sample region RS, a first image region RD1, a test region RT, and a second image region RD2, from the top toward the bottom in FIG. 8. In the inspection mode, the printing apparatus 11 transports the continuous paper P from the winding section 26 toward the feed section 14 (refer to FIG. 2 for both) in the order of the sample region RS, the first image region RD1, the test region RT, and the second image region RD2.

Note that, the sample region RS is a region in which a sample image or a portion of the first image region RD1 is printed onto the continuous paper P, and is for confirming the color and the like of the printed image. The test region RT is a region in which a nozzle check pattern is printed onto the continuous paper P, and is for confirming missing nozzles in the printed image, the presence of faintness or patchiness in the image, or the like. The test region RT is not limited to being printed between each image region, and may be printed after a plurality of image regions are printed.

Incidentally, when inspection is carried out on the continuous paper P which is subjected to printing, it is preferable that the user puts an emphasis on confirming the regions (each of the image regions RD1 and RD2) in the continuous paper P in which the printing is performed. Therefore, it is preferable that the continuous paper P is transported slowly for the regions (each of the image regions RD1 and RD2) of the continuous paper P in which the printing of the image is performed, whereas the continuous paper P is transported quickly in the regions (the sample region RS and the test region RT) in which the printing of the image is not performed.

Therefore, in light of the matters described above, the user operates the terminal 100 as illustrated in FIG. 8 to change the transport speed of the continuous paper P in the following manner.

When the user performs the inspection of the sample region RS, the user sets the transport speed of the continuous paper P to, for example, the maximum transport speed (the upper limit speed) by operating the slide operation portion 116 of the terminal 100 such that the transport speed of the continuous paper P becomes faster.

Next, when the user performs the inspection of the first image region RD1, the user sets the transport speed of the continuous paper P slower than the transport speed of the continuous paper P in the sample region RS by operating the slide operation portion 116 of the terminal 100 such that the transport speed of the continuous paper P becomes slower. As illustrated in FIG. 8 as an example, the transport speed of the continuous paper P in the first image region RD1 is set slower than the reference transport speed.

Next, when the user performs the inspection of the test region RT, the user sets the transport speed of the continuous paper P faster than the transport speed of the continuous paper P in the first image region RD1 by operating the slide operation portion 116 of the terminal 100 such that the transport speed of the continuous paper P becomes faster. As illustrated in FIG. 8 as an example, the transport speed of the continuous paper P in the test region RT is set to a transport speed which is faster than the reference transport speed and is slower than the maximum transport speed.

Next, when the user performs the inspection of the second image region RD2, in order to perform the inspection in the same manner as with the first image region RD1, the user sets the transport speed to the same transport speed of the continuous paper P in the first image region RD1 by operating the slide operation portion 116 of the terminal 100 such that the transport speed of the continuous paper P becomes slower.

In this manner, by operating the terminal 100, the user carries out operations such that the continuous paper P is transported at an appropriate transport speed in each of the regions of the sample region RS, the first image region RD1, the test region RT, and the second image region RD2.

Therefore, the user can quickly perform the inspection by increasing the transport speed of the continuous paper P in the sample region RS in which the color printed onto the continuous paper P is confirmed. Even in the test region RT in which missing nozzles and the like are confirmed, the user can quickly perform the inspection by increasing the transport speed of the continuous paper P. By decreasing the transport speed of the continuous paper P in each of the image regions RD1 and RD2, the user can perform the inspection of the images and the like which are printed onto the continuous paper P in detail.

Note that, even if the user changes the transport speed of the continuous paper P within each of the regions based on the slide operation of the slide operation portion 116. Accordingly, the user secures the time in which to perform the inspection by decreasing the transport speed of the continuous paper P in the portions within each region for which it is necessary to perform the detailed inspection, and in the portions for which it is not necessary to perform the detailed inspection, the user shortens the time in which to perform the inspection by increasing the transport speed of the continuous paper P.

According to the printing apparatus 11 of the present embodiment, it is possible to obtain the following operation effects.

(1) The printing apparatus 11 changes the transport speed and the transport direction of the continuous paper P based on a operation signal from the terminal 100. Therefore, it is possible to change the transport mode of the continuous paper P during the transportation of the continuous paper P.

In particular, when the user performs the inspection of the continuous paper P, by changing the transport speed of the continuous paper P, in the regions in which it is necessary to perform the inspection of the continuous paper P in detail, the user secures a long inspection time within those regions by decreasing the transport speed of the continuous paper P, and, in the regions in which it is not necessary to perform the inspection of the continuous paper P in detail, the user shortens the inspection time within those regions by increasing the transport speed of the continuous paper P. In this manner, by changing the transport speed of the continuous paper P, it is possible to appropriately perform the inspection of the continuous paper P, and it is possible to suppress the lengthening of the time taken in the inspection.

(2) The printing apparatus 11 sets the change amount of the transport speed of the continuous paper P based on an operation signal according to the slide operation amount from the slide operation portion 116 of the terminal 100. Therefore, it is possible to easily change to a transport speed which is desired by the user.

(3) When the transport speed of the continuous paper P reaches the upper limit speed, the control device 30 maintains the transport speed of the continuous paper P at the upper limit speed even if the control device 30 receives an operation signal from the terminal 100 indicating that the transport speed of the continuous paper P is to be increased. Therefore, the occurrence of an excessive load being applied to the feed motor 17 and the winding motor 28 is suppressed.

(4) Since the printing apparatus 11 is provided with a winding shaft 27 which winds the continuous paper P onto which the printing is performed, the occurrence of, for example, the continuous paper P onto which the printing is performed being placed on the floor surface is suppressed. Therefore, the occurrence of the continuous paper P being dirtied is suppressed.

(5) The printing apparatus 11 is provided with the first transport path RT1 for performing printing on the continuous paper P, and the second transport path RT2 for performing inspection of the printed continuous paper P. In other words, the printing apparatus 11 is provided with a function of performing printing on the continuous paper P, and a function of performing inspection of the continuous paper P. Therefore, in comparison to a case in which the inspection of the continuous paper P is performed using a separate inspection device from the printing apparatus 11, the work of setting the continuous paper P onto which the printing is performed in an inspection device is omitted. Therefore, it is possible for the user to easily perform the inspection of the continuous paper P.

(6) When the inspection of the continuous paper P is performed, the continuous paper P passes the front surface 13B side and the top surface 13C side of the apparatus main body 13 of the printing apparatus 11 as the second transport path RT2. Therefore, since the user can easily view the continuous paper P from the front of the printing apparatus 11, it is possible to easily perform the inspection of the continuous paper P.

The present embodiment may be modified into different embodiments as described below.

Figure 9:
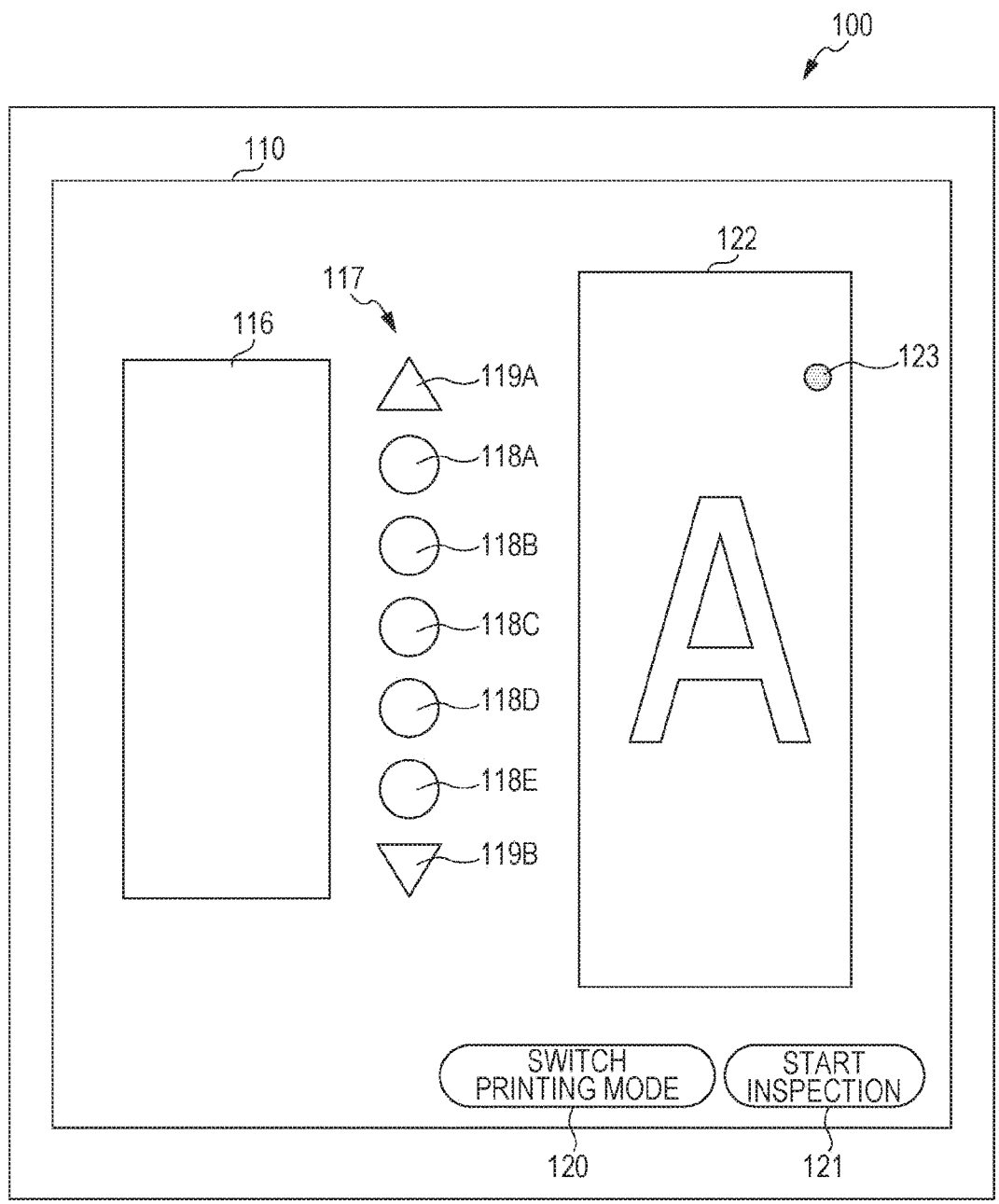
FIG. 9 is a plan view of a terminal of a modification example during the inspection mode.

Closer to the downstream side in the transport direction Y than the printing section 22, the printing apparatus 11 of the embodiment described above may be provided with a reading section which reads the printed continuous paper P. In this case, an image of the continuous paper P which is read by the reading section is transmitted to the terminal 100. During the inspection mode, as illustrated in FIG. 9, the touch panel 110 of the terminal 100 is provided with an image display portion 122 which displays the image of the continuous paper P on the right side of the touch panel 110. The slide operation portion 116 and the speed display portion 117 are displayed on the left side of the image display portion 122. The image of the continuous paper P is scrolled by the user performing a slide operation on the image of the continuous paper P which is displayed on the touch panel 110. Accordingly, the terminal 100 outputs an operation signal corresponding to the movement of the image of the continuous paper P to the control device 30. Accordingly, the control device 30 changes the transport amount of the continuous paper P based on the movement amount of the image of the continuous paper P in the touch panel 110 as an operation signal. Therefore, the continuous paper P is transported in accordance with the slide operation of the image of the image display portion 122. Note that, for example, a map indicating the relationship between the movement amount of the image of the continuous paper P and the transport amount of the continuous paper P is stored in advance in the control device 30. This map indicates a relationship in which the transport amount of the continuous paper P increases the greater the movement amount of the image of the continuous paper P. When the control device 30 receives the operation signal, the control device 30 calculates the transport amount of the continuous paper P from the movement amount of the image of the continuous paper P using the map. Note that, using the ratio of the actual size of the continuous paper P to the size of the image of the continuous paper P in the touch panel 110 as a function, the control device 30 may calculate the transport amount of the continuous paper P by multiplying this function by the movement amount of the image of the continuous paper P in the touch panel 110. The image which is displayed on the image display portion 122 may be the image data which is used when printing using the printing apparatus 11. In this case, it is possible to perform the inspection of the printed continuous paper P while comparing the continuous paper P with the original image.

In this case, since the continuous paper P is transported due to the image which is displayed on the touch panel 110 being directly subjected to a slide operation, it is possible to cause the actual transport amount of the continuous paper P to approach the transport amount of the continuous paper P which is anticipated by the user. Note that, the image may be subjected to slide operation after displaying the image on the entirety of the image of the touch panel 110.

In the modification example described above, as illustrated in FIG. 9, the terminal 100 may be provided with a function in which it is possible to apply a marker 123 to a predetermined position of the image in the transport direction Y of the image of the continuous paper P in the image display portion 122. When the user applies the marker 123 to the image of the continuous paper P in the image display portion 122, the terminal 100 outputs the position of the marker 123 in the transport direction Y of the continuous paper P to the control device 30 as an operation signal. The control device 30 receives the operation signal and calculates the transport amount of the continuous paper P in order to transport the continuous paper P to the position in which the marker 123 is applied in the transport direction Y of the continuous paper P. Note that, for example, due to the user long pressing a desired position of the image in the image display portion 122, the marker 123 is applied to that position.

In this case, since the continuous paper P is transported to a position of the image which the user desires due to the user performing an operation of applying the marker to the desired position of the image in the image in the image display portion 122, it is possible to easily perform an operation of transporting the continuous paper P to a specific position.

In the embodiment described above, the control device 30 changes the transport speed of the continuous paper P based on the operation signal of the terminal 100; however, the transport control of the continuous paper P based on an operation signal is not limited thereto. For example, as the transport control of the continuous paper P, the transport amount of the continuous paper P may be changed based on an operation signal. Specifically, a map indicating the relationship between the slide operation amount of the slide operation portion 116 of the terminal 100 and the transport amount of the continuous paper P is stored in the control device 30. In this map, the transport amount of the continuous paper P increases as the slide operation amount increases. When the control device 30 receives the operation signal, the control device 30 calculates the transport amount of the continuous paper P from the slide operation amount using the map. In this case, it is possible to easily change the transport amount of the continuous paper P to the transport amount which the user desires according to the operation of the terminal 100.

In the modification example described above, the terminal 100 is provided with a switching portion which switches between a first operation signal and a second operation signal. The first operation signal outputs an operation signal which changes the transport speed of the continuous paper P, and the second operation signal outputs an operation signal which changes the transport amount of the continuous paper P. The switching portion is displayed as a switching button in the touch panel 110, for example. The user switches between the output of the first operation signal and the second operation signal by long pressing the switching button in the touch panel 110. Meanwhile, the control device 30 is provided with a continued feed mode and an intermittent feed mode as control modes in the inspection mode, and a mode switching section. In the continued feed mode, it is possible to change the transport speed of the continuous paper P while transporting the continuous paper P, in the intermittent feed mode, the continuous paper P is transported by only the transport amount of the continuous paper P based on the slide operation amount, and, the mode switching section switches between the continued feed mode and the intermittent feed mode based on the first operation signal and the second operation signal.

In the inspection transport control, between step S11 and step S12, the control device 30 adds a determination step which determines whether or not the first operation signal is received, a mode switching step which switches between the continued feed mode and the intermittent feed mode based on the determination result, and a transportation step which transports the continuous paper P by only the transport amount of the continuous paper P based on the slide operation amount. When the control device 30 receives the first operation signal, the control device 30 sets the continued feed mode for the mode switching step, and subsequently transitions to step S12. Meanwhile, when the control device 30 does not receive the first operation signal, that is, when the control device 30 receives the second operation signal, for the mode switching step, the control device 30 sets the intermittent feed mode, transitions to the transportation step, transports the continuous paper P, and subsequently transitions to the determination of step S18.

In this case, in the continued feed mode, since the continuous paper P is transported even if the user does not operate the terminal 100, the operation amount when operating the transportation of the continuous paper P is reduced. In the intermittent feed mode, since the continuous paper P is transported according to the operation amount of the terminal 100, the user can determine the transport amount of the continuous paper P. Since the continued feed mode and the intermittent feed mode are provided in this manner and it is possible to switch between these modes, the user can appropriately operate the transport mode of the continuous paper P according to the transport state of the continuous paper P.

The control device 30 of the embodiment described above changes the transport direction of the continuous paper P based on the slide operation of the slide operation portion 116 when the transport speed of the continuous paper P is "0"; however, the changing of the transport direction of the continuous paper P is not limited thereto. For example, the terminal 100 is provided with a direction change command portion which changes the transport direction of the continuous paper P. The direction change command portion is displayed as a rectangular region similar to the slide operation portion 116 in the touch panel 110 of the terminal 100, for example. When the user performs the slide operation in the longitudinal direction on the direction change command portion, the control device 30 changes the transport direction of the continuous paper P, that is, the rotation direction (the drive direction) of the feed motor 17 and the winding motor 28 based on the direction of the slide operation.

In this case, since the transport direction of the continuous paper P is set based on the slide direction which is the direction in which the user performs the slide operation in the terminal 100, the user can set the transport direction of the continuous paper P in an intuitive manner.

In the embodiment described above, the terminal 100 may be provided with a transport stop command portion which stops the transportation of the continuous paper P. The transport stop command portion is displayed as a button which is operated by being pressed in the touch panel 110, for example. When the user outputs a signal which stops the transportation of the continuous paper P to the control device 30 as an operation signal using the terminal 100, the control device 30 outputs a drive command which stops the transportation of the continuous paper P to the transport drive section 34 based on the operation signal.

The relationship between the slide operation of the slide operation portion 116 of the terminal 100 and the changing of the transport speed of the continuous paper P and the changing of the transport direction of the continuous paper P is not limited to the embodiment described above. For example, it is possible to change the relationship between the slide operation and the transport speed and the transport direction of the continuous paper P to the following.

For example, the transport direction of the continuous paper P may be changed based on the slide direction of the slide operation portion 116. Specifically, the continuous paper P may be transported from the winding section 26 toward the feed section 14 due to an upward slide operation in the slide operation portion 116, and the continuous paper P may be transported from the feed section 14 toward the winding section 26 due to a downward slide operation.

When the transport direction of the continuous paper P is determined as being from the winding section 26 toward the feed section 14 using the slide operation portion 116, the transport speed of the continuous paper P may be increased by an upward slide operation in the slide operation portion 116, and the transport speed of the continuous paper P may be decreased by a long press of the slide operation portion 116. When the transport direction of the continuous paper P is determined as being from the feed section 14 toward the winding section 26 using the slide operation portion 116, the transport speed of the continuous paper P may be increased by a downward slide operation in the slide operation portion 116, and the transport speed of the continuous paper P may be decreased by a long press of the slide operation portion 116.

When performing the long press operation described above, the transport speed of the continuous paper P is decreased during the period in which the slide operation portion 116 is being long pressed. Note that, the transport speed of the continuous paper P may be decreased by subtracting a preset fixed speed from the transport speed, and the speed to be subtracted from the transport speed of the continuous paper P may be changed based on the pressing force of the long press of the slide operation portion 116. The transport speed of the continuous paper P may be decreased by touching the slide operation portion 116 instead of a long press operation. In this case, the transport speed of the continuous paper P decreases more the greater the number of times the slide operation portion 116 is touched.

The speed display portion 117 in the touch panel 110 of the terminal 100 may display different content from that in the embodiment described above, as shown next. In other words, the round symbol 118C of the center position of the round symbols 118A to 118E indicates a state in which the transportation of the continuous paper P is stopped, and, of the round symbols 118A and 118B which are displayed above the round symbol 118C, the round symbol 118B indicates the reference speed of the transport speed, and the round symbol 118A indicates the maximum speed. Meanwhile, of the round symbol 118D and 118E which are displayed below the round symbol 118C, the round symbol 118D indicates the reference speed at which the continuous paper P is transported in the opposite direction from the round symbol 118B, and the round symbol 118E indicates the maximum speed at which the continuous paper P is transported in the opposite direction from the round symbol 118B.

In the embodiment described above, the slide operation portion 116 may be a shape which extends in the horizontal direction of the terminal 100. In this case, the terminal 100 outputs an operation signal due to the user performing a slide operation in the horizontal direction of the terminal 100 in the slide operation portion 116.

In the embodiment described above, the transport speed (and the transport amount in the modification example described above) of the continuous paper P is set based on the slide operation amount; however, the setting of the transport speed and the transport amount of the continuous paper P is not limited thereto. For example, the transport speed and the transport amount of the continuous paper P may be changed according to the number of times the slide operation portion 116 is tapped or the strength of the touch when the touch is performed.

In the embodiment described above, it is possible to adjust the transport speed in five stages using the five round symbols 118A to 118E in the touch panel 110 during the inspection mode; however, the transport speed may be adjusted in two stages to four stages or in six or more stages. The transport speed may also be non-staged.

The terminal 100 of the embodiment described above may not be provided with the touch panel 110. In this case, the terminal 100 is provided with operation buttons or operation levers for outputting the operation signal.

In the embodiment described above, from the printing apparatus 11 to the winding section 26 may be omitted. In other words, a configuration may be adopted in which the continuous paper P which is cut by the cutting section 24 after being fed out from the feed section 14 and recording being performed thereon by the printing section 22 is temporarily placed on the floor surface or the like. Subsequently, the terminal end of the continuous paper P during the inspection is attached to the paper tube PT of the feed section 14.

In the embodiment described above, during the printing mode, the transport mode such as the transport speed and the transport amount of the continuous paper P may be changed based on the operation signal of the terminal 100.

In the embodiment described above, instead of the terminal 100, at least one of the operation section 18 of the printing apparatus 11 and the host computer 200 may be given the same function as the terminal 100.

In the embodiment described above, from the control device 30 to the print drive section 35 may be omitted.

In this case, the printing apparatus 11 is provided with a different print control device from the control device 30. The print control device is provided with the print drive section 35.

In the embodiment described above, the printing apparatus 11 may be a dot impact printer or a laser printer as long as the printing apparatus 11 is capable of printing onto the medium. The printing apparatus 11 is not limited to a configuration which is provided with only a printing function, and may also be a copier. The printing apparatus 11 is not limited to a serial printer, and may be a line printer or a page printer.

In the embodiment described above, an inspection device which performs the inspection of the continuous paper P which is printed on by the printing apparatus may be used as the medium transport device instead of the printing apparatus 11. The inspection device is formed separately from the printing apparatus 11.

The medium is not limited to the continuous paper P, and may be single sheet paper, a resin film, a metal foil, a metal film, a composite film (a laminate film) of a resin and a metal, a textile, a non-woven fabric, a ceramic sheet, or the like.

The state of the liquid which is discharged as minute droplets from the printing section 22 includes liquids of a droplet shape, a tear shape and liquid which forms a line-shaped tail. The liquid referred to here may be a material which can be ejected from the printing section 22. For example, the liquid may be a material which is in a liquid phase state, and includes liquid bodies of high or low viscosity, and fluid bodies such as sol, gel, other inorganic solvents, organic solvents, solutions, and liquid resin. The liquid not only includes liquids as a state of a material, but also includes solutions, disperses and mixtures in which particles formed of solids such as pigments are dissolved, dispersed or mixed into a solvent. When the liquid is an ink, the term "ink" includes general aqueous inks and solvent inks, in addition to various liquid compositions such as gel ink and hot melt ink.

What is claimed is:

1. A transport device, comprising:
a transport section that transports a continuous medium; and
a controller that controls the transport section;
wherein the controller controls a transport amount and a transport direction of the continuous medium based on a slide amount and a slide direction of an operation section,
wherein the controller controls a transport speed of the continuous medium which speed is calculated based on the slide amount, and
wherein the controller controls the transport direction of the continuous medium from a first direction to a second direction when the controller detects that the transport speed is zero and the slide direction is in the second direction.

2. The transport device according to claim 1,
wherein, when a transport speed of the continuous medium reaches an upper limit speed, the transport speed is set to the upper limit speed regardless of an operation indicating that the transport speed of the continuous medium is to be increased.

3. The transport device according to claim 1,
wherein the controller is configured to switch between a continued feed mode which continues transportation of the continuous medium after starting the transportation of the continuous medium based on operation of the operation section, and an intermittent feed mode which transports the continuous medium by only the transport amount according to the slide amount.

4. The transport device according to claim 1, further comprising:
a winding shaft that winds the continuous medium on which printing is performed,
wherein the transport section transports the continuous medium wound on the winding shaft to unwind the continuous medium.

5. A printing apparatus, comprising:
a transport device according to claim 1; and
a printing section that performs printing on the continuous medium which is transported by the transport section.

6. The transport device according to claim 1,
wherein the transport section transports the continuous medium in accordance with a slide operation of an image, which is printed onto the continuous medium and displayed on the operation section.

7. A transport device, comprising:
a transport section that transports a continuous medium; and
a controller that controls the transport section;
wherein the controller controls a transport amount and a transport direction of the continuous medium based on a slide amount and a slide direction of an operation section; and
wherein the transport section transports the continuous medium in accordance with a slide operation of an image, which is printed onto the continuous medium and displayed on the operation section.

8. The transport device according to claim 7,
wherein the controller receives positional information of a marker from the operation section based on an operation of applying the marker to the image, which is printed onto the continuous medium and displayed on the operation section,
wherein the controller controls the transport of the continuous medium to the same position as the marker in the image based on the positional information of the marker.

9. A transport device, comprising:
a transport section that transports a medium based on a transport direction and a transport parameter based on a slide on a touch panel; and
a controller that controls the transport section,
wherein the controller controls the transport direction of a continuous medium from a first direction to a second direction when the controller detects that the transport speed is zero and the slide direction is in the second direction.

10. The transport device according to claim 9, wherein the transport parameter is a transport amount, which the transport amount is calculated based on an slide amount on the touch panel.

11. The transport device according to claim 9, wherein the transport parameter is a transport speed, which the transport speed is calculated based on an slide amount on the touch panel.

12. The transport device according to claim 9, wherein the transport section is configured to switch between a continued feed mode which continues transportation of the continuous medium after starting the transportation of the medium based on operation of the operation section, and an intermittent feed mode which transports the medium by only a transport amount according to the slide amount.

13. The transport device according to claim 9,
wherein the transport section transports the medium in accordance with a slide operation of an image, which is printed onto the medium and displayed on the touch panel.

* * * * *